Patented Mar. 12, 1935

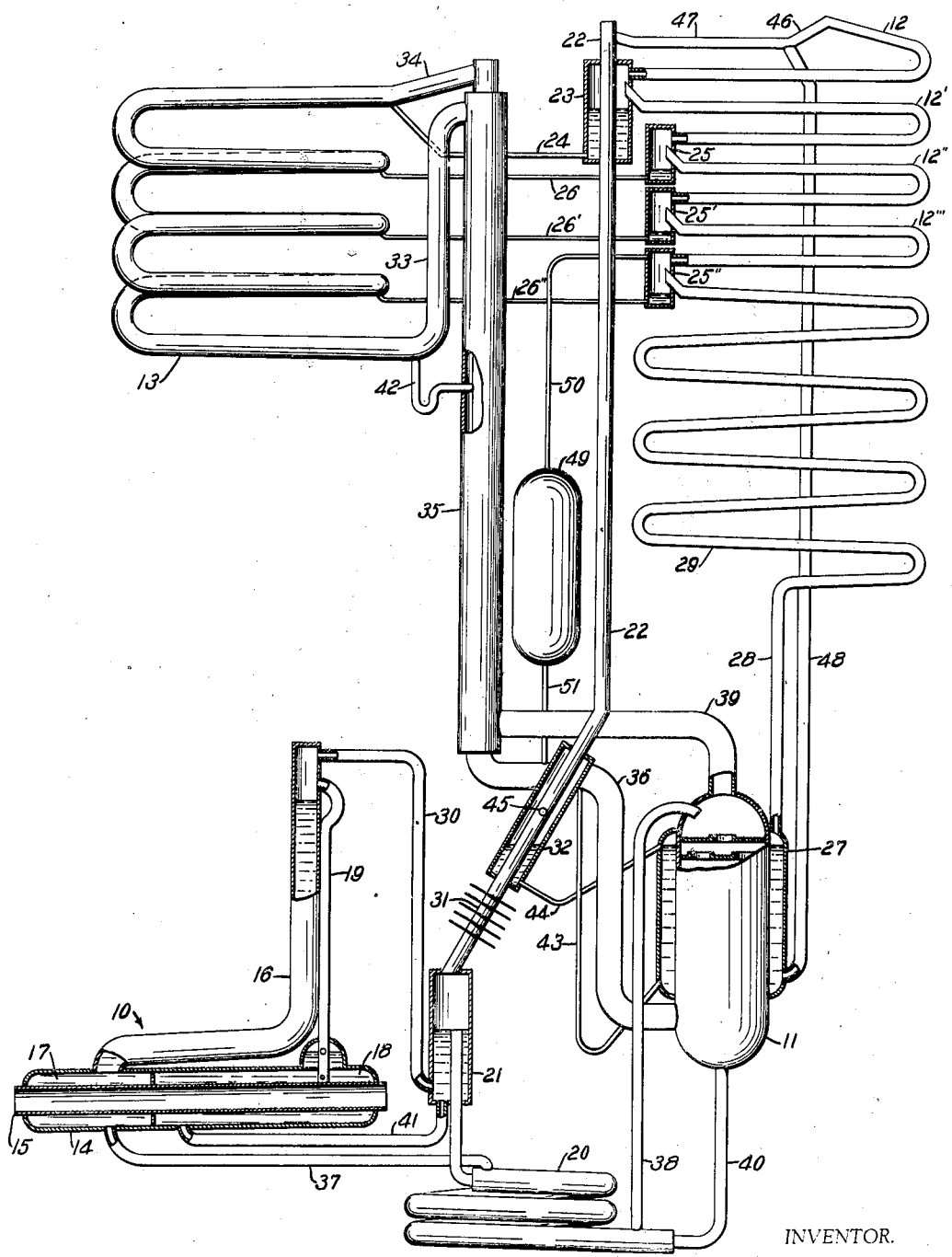

1,994,080

UNITED STATES PATENT OFFICE 1,994,080

REFRIGERATION

Hugo M. Ullstrand, Evansville, Ind., assignor to Electrolux Servel Corporation, New York, N. Y., a corporation of Delaware Application July 25, 1933, Serial No. 682,043

24 Claims. (Cl. 62—119.5)

My invention relates to refrigeration and more particularly to refrigeration systems of the absorption type.

In accordance with my invention I provide a continuous absorption system of the pressure equalized type especially adapted for air cooled refrigerators of the household type. In such an installation, the cooling element or evaporator should be located at the top of the refrigerator storage compartment for the most effective cooling of air in the compartment with natural circulation, as well known in the art. Carrying out the feature of lack of moving parts of a pressure equalized system, the condenser is usually arranged above the evaporator for flow of condensed refrigerant to the latter by gravity. In order to secure sufficient condenser surface for cooling with air, it is necessary to extend the condenser above the refrigerator cabinet or in any other direction with respect thereto except downward. To construct an air cooled absorption system for household refrigerators occupying a minimum space within the outline of the refrigerator cabinet, it has heretofore been proposed to employ a plurality of vertically spaced condensers or condenser sections which drain into the evaporator at different levels, or extend the condenser downwardly below the evaporator and raise the condensate from the condenser to the evaporator by thermosyphonic action.

In an absorption refrigeration system, heat must also be removed from the absorber which, in pressure equalized systems, is usually located at the bottom of the unit and in the lower part of the refrigerator cabinet. Although the absorber may be cooled by direct flow of air over an extensive surface thereof, it has been found advantageous to provide a secondary vaporization-condensation cycle for transferring heat from the absorber to the air. Heretofore a separate absorber cooling cycle has been provided or the system has been arranged for cooling of the absorber by vaporization of some of the primary refrigerant in its path of flow from the condenser to the evaporator. An advantage of the second arrangement is equal pressures in the primary and absorber cooling systems. However, in order to extend the condenser cooling surface below the evaporator, it is necessary to raise the liquid from the lower level to the evaporator level, usually by thermosyphonic action.

I provide an air cooled absorption refrigeration system of the pressure equalized type adapted to occupy a minimum space within the outline of a refrigerator cabinet and having an absorber cooling cycle utilizing primary refrigerant at the same pressure as in the primary system but which requires no raising of liquid to the evaporator level. Furthermore, my invention presents the distinct advantage of an absorber cooling cycle communicating with the primary refrigeration system that is automatically and effectively purged. By "purging" I mean the displacement of solution from the absorber cooling system and replacement by liquid refrigerant which has a lower boiling point than the solution.

Briefly, I arrange the primary condenser in a plurality of vertically spaced sections which drain at different levels into the evaporator, thus making unnecessary any appreciable projection of the condenser above the evaporator as set forth above. I also provide an evaporation-condensation cycle comprising an evaporation member in thermal exchange relation with the absorber and connected to a secondary condenser at a higher level. The secondary condenser is vented to the primary circuit for equalization of pressure. The evaporation member is supplied with liquid refrigerant from the primary circuit by drainage from a small section of the primary condenser, from the primary evaporator, or both, the quantity of liquid in the secondary system being maintained substantially constant by overflow of excess liquid into the primary system. I may utilize the excess liquid from the absorber cooling system to supply an auxiliary rectifier in the primary refrigeration system. My invention, together with the objects and advantages thereof, will be more fully understood by reference to the following description taken in connection with the accompanying drawing, in which, The figure shows schematically an absorption refrigeration system of the pressure equalized type embodying my invention.

Referring to the drawing, the system comprises essentially a generator 10, an absorber 11, a condenser 12, and an evaporator 13, interconnected to form a circuit for refrigerant fluid including an auxiliary circuit for inert pressure equalizing gas between the evaporator and absorber, as fully described and explained in Patent No. 1,609,334 to von Platen et al. The generator 10 is of a type well known in the art, generally referred to as a horizontal type generator, comprising a horizontal portion 14 heated by any suitable means such as a gas burner (not shown) in a flue 15, and a standpipe 16. The generator is adapted to contain a suitable solution of refrigerant in an absorption liquid such as a water solution of ammonia. The horizontal portion 14 is divided into two chambers, one chamber 17 communicating with the lower end of the standpipe 16 and the other chamber 18 being connected to the upper end of the standpipe 16 by a thermosyphon element 19 for circulation of solution in a manner well known in the art. The absorber 11 is interconnected through a liquid heat exchanger 20 and an analyzer 21 for circulation of absorption solution as hereinafter described.

The condenser 12 comprises a plurality of pipe coil sections between each of which is connected a liquid trap connected to drain at corresponding levels into the coil type evaporator 13. The liquid trap between the first two condenser sections is arranged as a jacket around the conduit 22 which conducts vapor from the generator to the condenser thus forming a liquid cooled rectifier 23. An overflow conduit 24 is connected from the lower part of the rectifier 23 to the upper end of the evaporator 13. The succeeding liquid traps 25 are connected through conduits 26 to successively lower points of the evaporator.

The absorber 11 is provided with a cooling element shown as a jacket 27 adapted to retain cooling liquid in thermal exchange relation with the absorber. The upper part of the absorber cooling element 27 is connected through conduit 28 to the lower end of a coil type condenser 29 and the upper end of the latter is connected to the upper part of the lower condenser liquid trap 25''. Other parts of the apparatus and their connections in the system will be described in connection with the following description of the operation.

Ammonia vapor expelled from solution by heat in the generator 10 flows from the upper end of the standpipe 16 through conduit 30 into the lower part of the analyzer 21 where it bubbles upwardly through strong solution returning from the absorber to the generator as hereinafter described. From the upper part of the analyzer 21, the vapor flows through a high temperature air cooled rectifier 31, an auxiliary liquid cooled rectifier 32, and the liquid cooled rectifier 23 into the upper end of the condenser 12. In the several rectifiers, the generated vapors are successively cooled, causing condensation of water vapor out of the ammonia. The water drains back into the analyzer 21 and thus returns to the solution circuit.

Ammonia condensed to liquid in the first section of the condenser accumulates in the rectifier 23 from where it overflows through conduit 24 to the upper end of the evaporator 13. Uncondensed vapor, together with vapor formed by the transfer of heat of rectification, passes into the second condenser section 12'. Condensate from this section drains into the liquid trap 25 from where it flows through conduit 26 to the next lower turn of the evaporator coil 13. Thus from each of the condenser sections, liquid ammonia formed therein drains to a corresponding section of the evaporator and uncondensed vapor passes to the next succeeding condenser section.

In the evaporator 13, the liquid ammonia evaporates by diffusion into an inert pressure equalizing gas such as hydrogen which enters the evaporator through conduit 33, thus producing refrigeration as well known in the art. The resulting gas mixture flows from the evaporator through conduit 34, gas heat exchanger 35, and conduit 36 into the lower part of the absorber 11. Weakened absorption solution flows from the generator through conduit 37, liquid heat exchanger 20, and conduit 38 into the upper part of the absorber. Ammonia is absorbed out of the gas mixture into the weakened solution in the absorber and the hydrogen returns from the upper part of the absorber through conduit 39, gas heat exchanger 35, and conduit 33 to the lower end of the evaporator coil 13, thus completing the auxiliary circuit of the pressure equalizing gas. Enriched absorption solution accumulates in the lower part of the absorber 11 from where it flows through conduit 40 and liquid heat exchanger 20 into the analyzer 21 in which the liquid stands at substantially the same level as in the absorber. From the analyzer, the rich solution returns through conduit 41 to chamber 18 of the generator from where it is raised through the thermosyphon element 19 to a higher level in the standpipe 16, whereby liquid is maintained in the latter at such a level that the previously described overflow of weakened solution into the absorber occurs.

The absorber 11 is cooled by transfer of the heat of absorption to liquid ammonia in the jacket or cooling element 27. This transfer of heat supplies the heat of vaporization of the ammonia, the vapor of which rises through conduit 28 into the condenser 29 where it is condensed to liquid by heat transfer to the cooling medium such as air. The liquid drains back from the condenser through conduit 28 into the absorber cooling jacket 27 thus completing a secondary evaporation-condensation cycle for transferring heat from the absorber to the air. Obviously both the primary condenser 12 and the secondary condenser 29 should be arranged for most effective cooling by natural air circulation, or forced draft may be used.

Liquid ammonia may be supplied to the absorber cooling element 27 in one of two ways or both. Assuming that the system is placed in operation by applying heat to the generator 10, the evaporation of ammonia into the hydrogen in the evaporator 13 will continue only as long as ammonia is absorbed out of the gas in the absorber 11. As the temperature of the absorber increases, the amount of ammonia absorbed decreases until all of the liquid ammonia supplied to the evaporator 13 does not evaporate. This unevaporated ammonia drains from the lower end of the evaporator 13 through a conduit 42 into the rich gas line of the heat exchanger 35. In the latter, the liquid flows downwardly into conduit 36 from which it is drained through a conduit 43 into the absorber cooling jacket 27. If, upon starting operation, the absorber cooling jacket 27 should contain solution, which has a much higher boiling point than the liquid ammonia, the above described draining of unevaporated ammonia into the jacket will occur and the solution, displaced by liquid ammonia, will overflow through a conduit 44 from the upper part of the jacket into the auxiliary rectifier 32. The latter is provided with a vent and drain opening 45 for overflow of liquid into the analyzer 21 and thus back into the solution circuit between the generator and absorber. This displacement of solution by liquid ammonia is referred to as purging.

In order to keep the auxiliary rectifier 32 supplied with cooling liquid, I provide in the primary condenser 12 a liquid trap 46 from which ammonia condensed in a short section 47 of the condenser is drained through a conduit 48 into the absorber cooling jacket 27. The liquid trap 46 is located in the condenser at such a point that just enough liquid is drained through conduit 48 into the absorber cooling jacket 27 to cause overflow through conduit 44 of sufficient liquid to replace that evaporated in the auxiliary rectifier 32 by transfer therein of heat of rectification. Liquid draining into the absorber cooling jacket through conduit 48 will purge the latter of solution in the same manner as the liquid supplied from the evaporator as previously described.

In order to vary the total pressure in the system responsive to variations in temperature of the cooling air I provide a pressure vessel 49 for storage of an excess quantity of hydrogen in the vent line from the condenser to the gas circuit as well known in the art. The upper end of vessel 49 is connected through a conduit 50 to the upper part of the lower condenser trap 25" and the lower end of vessel 49 is connected through a conduit 51 to conduit 36 in the auxiliary gas circuit. Under normal operating conditions the pressure vessel 49 contains substantially pure hydrogen. Upon increase in temperature of the cooling air above normal, condensation of ammonia in the condenser 12 is not complete, wherefore uncondensed ammonia vapor flows through conduit 50 into the pressure vessel 49 displacing hydrogen through conduit 51 into the auxiliary gas circuit between the absorber and evaporator. The addition of hydrogen to the auxiliary circuit raises the pressure until it reaches such a value that complete condensation occurs again in the condenser at the increased temperature. Upon decrease in temperature of the cooling air, ammonia condenses in the pressure vessel 49 and is replaced by hydrogen from the auxiliary circuit, thus decreasing the pressure in the latter to correspond to the decrease in air temperature. The ammonia condensed in the pressure vessel drains through conduit 51, conduit 36, and conduit 43 into the absorber cooling jacket 27.

It will be obvious to those skilled in the art that various other changes may be made in the construction and arrangement without departing from the spirit of the invention and therefore the invention is not limited to what is shown in the drawing and described in the specification but only as indicated in the following claims.

I claim:

1. A refrigeration system comprising a generator, a condenser, an evaporator, and an absorber interconnected for circulation of refrigerant fluid, a cooling element for said absorber adapted to contain refrigerant fluid and a second condenser connected to receive vapor from said absorber cooling element and return condensate thereto by gravity, said second condenser being in open communication with said refrigerant fluid circuit.

2. In an absorption refrigeration system, a generator, a condenser, an evaporator, an absorber, means interconnecting said elements to form a main circuit for refrigerant fluid and an auxiliary circuit for pressure equalizing gas between said evaporator and absorber, a cooling element for said absorber adapted to contain refrigerant fluid, a second condenser connected to receive vapor from said cooling element and return condensate thereto by gravity, and a vent from said second condenser to said auxiliary gas circuit.

3. In an absorption refrigeration system, a generator, a condenser, an evaporator, and an absorber interconnected to form a circuit for refrigerant fluid, a cooling element for said absorber, a drain for unevaporated liquid refrigerant from said evaporator to said absorber cooling element, a second condenser connected to receive vapor from said cooling element and return condensate thereto by gravity, and a pressure equalizing connection from said second condenser to said refrigerant fluid circuit.

4. In an absorption refrigeration system, a generator, a condenser, an evaporator, an absorber, means interconnecting said elements to form a main circuit for refrigerant fluid including an auxiliary circuit for pressure equalizing gas between said evaporator and absorber and a circuit for absorption liquid between said absorber and generator, a cooling element for said absorber, a drain for unevaporated liquid refrigerant from said evaporator to said absorber cooling element, an overflow connection from said cooling element to said absorption liquid circuit, and a secondary condenser connected to receive vapor from said absorber cooling element and return condensate thereto by gravity.

5. In an absorption refrigeration system, a generator, a condenser, an evaporator, and an absorber interconnected to form a circuit for refrigerant fluid, and means exclusive of said circuit providing a vaporization-condensation cycle for cooling said absorber, adapted to contain refrigerant fluid and having a pressure equalizing connection with said refrigerant fluid circuit.

6. In an absorption refrigeration system, a generator, a condenser, an evaporator and an absorber interconnected to form a circuit for refrigerant fluid, means exclusive of said circuit and providing a vaporization-condensation cycle for cooling said absorber, a pressure equalizing connection from said cycle to said refrigerant fluid circuit, and means for supplying liquid refrigerant to said cycle upon increase in temperature of said absorber.

7. In an absorption refrigeration system, a generator, a condenser, an evaporator and an absorber interconnected to form a circuit for refrigerant fluid, a separate vaporization-condensation cycle for cooling said absorber, a pressure equalizing connection from said cycle to said refrigerant fluid circuit, a liquid cooled rectifier in said refrigerant fluid circuit between said generator and condenser, and means for delivering a small quantity of liquid refrigerant from said condenser through said separate cycle to said rectifier.

8. In an absorption refrigeration system, a generator, a condenser, an evaporator and an absorber interconnected to form a circuit for refrigerant fluid, means exclusive of said circuit and providing a vaporization-condensation cycle for cooling said absorber, a pressure equalizing connection from said cycle to said refrigerant fluid circuit, and means for supplying liquid refrigerant to said cycle from said condenser.

9. In an absorption refrigeration system, a generator, a condenser, an evaporator, and an absorbed interconnected to form a circuit for refrigerant fluid, means exclusive of said circuit and providing a vaporization-condensation cycle for cooling said absorber, a liquid cooled rectifier for vapors from said generator, means for supplying liquid refrigerant from said condenser to said cycle, and means for supplying excess liquid from said cycle to said rectifier.

10. In an absorption refrigeration system having a circuit for refrigerant fluid including an absorber, means exclusive of said circuit and providing a vaporization-condensation cycle for cooling said absorber, and means for supplying said cycle with liquid refrigerant fluid from said circuit upon increase in temperature of said absorber.

11. In an absorption refrigeration system including an evaporator and an absorber, a separate vaporization-condensation cycle for cooling said absorber, and means for supplying unevaporated liquid refrigerant from said evaporator to said cycle.

12. In an absorption refrigeration system having a circuit for refrigerant fluid including an absorber, means exclusive of said circuit and providing a vaporization-condensation cycle for cooling said absorber, a pressure equalizing connection between said cycle and said circuit, and means for supplying liquid refrigerant fluid from said system to said cycle upon increase in temperature of said absorber.

13. In an absorption refrigeration system having a circuit for refrigerant fluid including a generator and an absorber, means exclusive of said circuit and providing a vaporization-condensation cycle for cooling said absorber, a liquid cooled rectifier for vapors from said generator, means for supplying liquid refrigerant fluid from said circuit to said cycle, and means for supplying excess liquid from said cycle to said rectifier.

14. In an absorption refrigeration system including a generator, an absorber and an evaporator, a separate vaporization-condensation cycle for cooling said absorber, a liquid cooled rectifier for vapors from said generator, means for supplying unevaporated liquid refrigerant from said evaporator to said cycle, and means for supplying excess liquid from said cycle to said rectifier.

15. An absorption refrigeration system comprising a generator and an absorber interconnected for circulation of absorption solution therebetween, an evaporator above said absorber and interconnected therewith for circulation of an auxiliary pressure equalizing gas therebetween, a condenser connected to receive vapor from said generator and having upper and lower sections, a cooling element for said absorber, means for draining liquefied refrigerant from said upper condenser section to said evaporator, and a conduit between said absorber cooling element and said lower condenser section for flow of vapor from the cooling element to the condenser section and return flow of condensate.

16. An absorption refrigeration system comprising a generator and an absorber interconnected for circulation of absorption solution therebetween, an evaporator above said absorber and interconnected therewith for circulation of an auxiliary pressure equalizing gas therebetween, a condenser connected to receive vapor from said generator and having a plurality of upper sections and a lower section, means for draining liquefied refrigerant from said upper condenser sections to said evaporator at a corresponding plurality of levels, and a cooling element for said absorber connected to said lower condenser section for flow of vapor from the cooling element to the condenser section and return flow of condensate.

17. An absorption refrigeration system comprising a generator and an absorber interconnected for circulation of absorption solution therebetween, an evaporator above said absorber and interconnected therewith for circulation of an auxiliary pressure equalizing gas therebetween, a condenser connected to receive vapor from said generator and having upper and lower sections, a liquid cooled rectifier for vapor flowing from said generator to said condenser, means for conducting liquid refrigerant from said upper condenser section to said evaporator, a cooling element for said absorber connected to said lower condenser section for flow of vapor from the cooling element to the condenser section and return flow of condensate, a conduit for unevaporated liquid refrigerant from said evaporator to said absorber cooling element, and an overflow connection for excess liquid from said absorber cooling element to said rectifier.

18. An absorption refrigeration system comprising a generator and an absorber interconnected for circulation of absorption solution therebetween, an evaporator above said absorber and interconnected therewith for circulation of an auxiliary pressure equalizing gas therebetween, a condenser connected to receive vapor from said generator and having upper and lower sections, means for conducting liquefied refrigerant from said upper condenser section to said evaporator, a liquid cooled rectifier for vapor flowing from said generator to said condenser, a cooling element for said absorber connected to said lower condenser section for flow of vapor from the cooling element to the condenser section and return flow of condensate, means for draining a relatively small quantity of liquid refrigerant from said upper condenser section to said absorber cooling element, and an overflow connection for excess liquid from said absorber cooling element to said rectifier.

19. In a method of refrigeration with an absorption type system which comprises flowing refrigerant fluid through a generation-condensation-evaporation-absorption cycle in a circuit including a generator, a condenser, an evaporator, and an absorber, that improvement which consists in withdrawing liquid refrigerant fluid from said condenser and cooling said absorber by vaporization and condensation of said withdrawn fluid outside of said circuit but at a pressure equal to that in said circuit.

20. In a method of refrigeration with an absorption type system which comprises flowing refrigerant fluid through a generation-condensation-evaporation-absorption cycle in a circuit including a generator, a condenser, an evaporator, and an absorber, that improvement which consists in withdrawing unevaporated liquid refrigerant fluid from said evaporator and cooling said absorber by vaporization and condensation of said withdrawn fluid outside of said circuit but at a pressure equal to that in said circuit.

21. In a method of refrigeration with an absorption type system which comprises flowing refrigerant fluid through a generation-condensation-evaporation-absorption cycle in a circuit including a generator, a condenser, an evaporator, and an absorber, that improvement which consists in withdrawing liquid refrigerant fluid from both said condenser and said evaporator, and cooling said absorber by vaporization and condensation of said withdrawn fluid at a pressure equal to that in said circuit.

22. In a method of refrigeration with an absorption type system which comprises flowing refrigerant fluid in a circuit including an absorber, that improvement which consists in withdrawing refrigerant fluid from said circuit and cooling said absorber by vaporization and condensation of said withdrawn fluid outside of said circuit but at a pressure equal to that in said circuit.

23. In a method of refrigeration with an absorption type system which comprises flowing refrigerant fluid through a generation-condensation-evaporation-absorption cycle in a circuit including a generator, a rectifier, a condenser, an evaporator, and an absorber, that improvement which consists in withdrawing liquid refrigerant fluid from said circuit, and cooling said absorber and said rectifier by vaporization of said withdrawn liquid outside of said circuit but at a pressure equal to that in said circuit.

24. In a method of refrigeration with an absorption type system which comprises flowing refrigerant fluid through a generation-condensation-evaporation-absorption cycle in a circuit including a generator, a condenser, an evaporator, and an absorber, that improvement which consists in withdrawing refrigerant fluid from said circuit and cooling said absorber by transfer of heat to the atmosphere by vaporization and condensation of said withdrawn fluid outside of said circuit but at a pressure equal to that in said circuit.

HUGO M. ULLSTRAND.